3,772,434
INSECTICIDAL COMPOSITION AND METHOD CONTAINING ARYL-METHYL PHENACYL SULFONIUM TETRAFLUOROBORATES
Kenneth Wayne Ratts, Creve Coeur, Mo., assignor to Monsanto Company, St. Louis, Mo.
No Drawing. Original application May 28, 1971, Ser. No. 148,196, now Patent No. 3,723,534. Divided and this application Nov. 2, 1972, Ser. No. 303,185
Int. Cl. A01n 9/12
U.S. Cl. 424—185     14 Claims

ABSTRACT OF THE DISCLOSURE

An insecticidal composition and method containing compounds of the formula

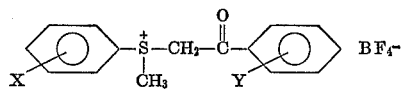

These compositions are useful in controlling soil insects of the genus Diabrotica.

---

This is a division of application Ser. No. 148,196, filed May 28, 1971, now U.S. Pat. No. 3,723,534.

This invention relates to novel chemical compounds and their utility as insecticides. More particularly, the invention is directed to a series of aryl methyl phenacyl sulfonium tetrafluoroborates; their use in controlling soil insects of the genus Diabrotica; and to insecticidal compositions wherein said tetrafluoroborates are the active insecticidal agents.

These novel compounds may be graphically represented by the formula

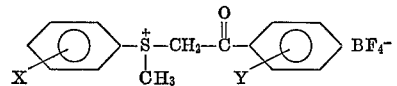

wherein X and Y are radicals selected from the group consisting of hydrogen, nitro, lower alkyl, lower alkoxy and halogen.

Preferably, the moiety X is para oriented and selected from the group consisting of hydrogen, methyl, tert-butyl, nitro or a halogen of atomic weight between 35 and 80, (i.e. chlorine or bromine); and the Y moiety is preferably selected from hydrogen, methoxy and chlorine with not more than one of X and Y being hydrogen.

The term "lower" as used herein connotes those alkyl and alkoxy radicals which have from one to four carbon atoms. That is, lower alkyl refers to methyl, ethyl, propyl or butyl and the various isomeric forms thereof; while lower alkoxy includes methoxy, ethoxy, propoxy or butoxy and isomeric counterparts.

The novel compounds of this invention may be prepared by merely bringing together in an inert organic solvent at room temperature substantially equimolecular proportions of an appropriate aryl phenacyl sulfide and trimethyloxoniumtetrafluoroborate. The resulting reaction effects an alkylation of the aryl phenacyl sulfide and formation of the tetrafluoroborate salt thereof. These reactions are represented below with the X and Y moieties of Compounds I and II having the aforedescribed significance.

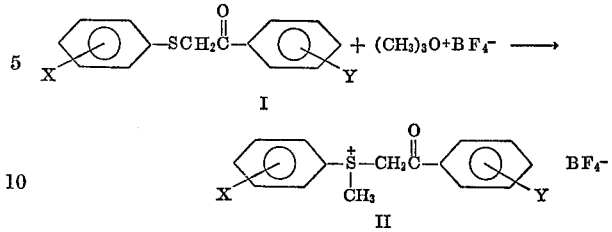

The substituted aryl phenacyl sulfide precursor (I above) can be prepared by reacting in substantially equimolecular quantities an appropriately substituted thiophenol with a properly substituted 2-bromoacetophenone. Typically, the reaction is carried out at reflux temperatures in a solution of sodium ethoxide. This reaction is set out below with the X and Y radicals of the compounds shown having the designation as noted hereinabove.

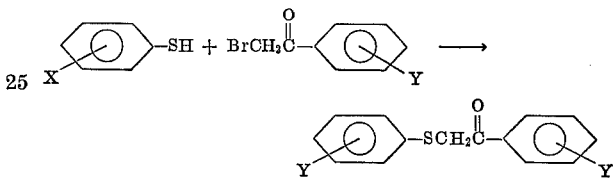

In illustration of specific preparations of the novel tetrafluoroborates of this invention but not in limitation thereof, the following examples are presented. All parts are by weight unless otherwise indicated.

EXAMPLE I (p-Chlorophenacyl) (p-chlorophenyl)methylsulfonium tetrafluoroborate

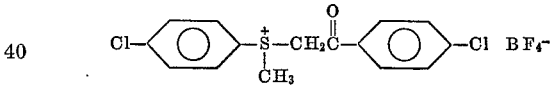

The procedure used in preparing the sulfide precursors of this invention is illustrated in this example by the preparation of p-chlorophenyl p-chlorophenacyl sulfide.

To 350 parts of absolute ethanol there was added and dissolved therein 11.5 parts (0.5 mol) of sodium. To this sodium ethoxide solution there was added 72.3 parts (0.5 mol) of p-chlorothiophenol, followed by portionwise addition 116.8 parts (0.5 mol) of 2-bromo-4-chloroacetophenone. The mixture was heated at reflux for approximately 10 minutes and poured onto 2 liters of ice. Filtration of the suspension gave a brown solid which upon recrystallization from methanol yielded 123.3 parts of p-chlorophenyl p-chlorophenacyl sulfide melting at 103–105° C.

The p-chlorophenyl p-chlorophenacyl sulfide as obtained above (29.7 parts, 0.1 mol) was added to trimethyloxoniumtetrafluoroborate (14.8 parts, 0.1 mol) in 200 parts of methylene chloride at room temperature. The mixture, after standing 10 days was diluted with ether and filtered. The (p-chlorophenacyl) (p-chlorophenyl) methylsulfonium tetrafluoroborate was obtained as a light yellow solid which after washing with ether and drying yielded 35 parts of a product having a melting point of 118–119° C.

EXAMPLE II (p-Chlorophenyl)methylphenacylsulfonium tetrafluoroborate

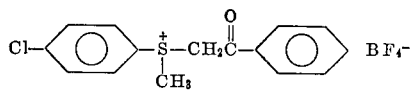

There was dissolved in 100 parts of methylene chloride, 13.1 parts of p-chlorophenyl phenacyl sulfide. Added to this solution was 7.4 parts of trimethyloxonium-tetrafluoroborate dissolved in 100 parts of methylene chloride. After allowing the reaction mixture to stand at room temperature for about 8 days, it was diluted with ether and filtered. The (p-chlorophenyl) methylphenacylsulfonium tetrafluoroborate was obtained as a white solid which after washing with ether and drying resulted in a 93 percent yield, M.P. 122.5 to 123.5.

EXAMPLE III (p-Bromophenyl)methylphenacylsulfonium tetrafluoroborate

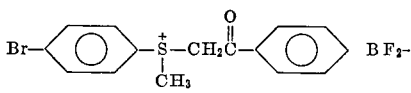

Employing the procedure of Example II above but replacing p-chlorophenyl phenacyl sulfide with a substantially equimolecular amount of p-bromophenyl phenacyl sulfide there was obtained (p-bromophenyl) methylphenacylsulfonium tetrafluoroborate, a colorless solid melting at 111–112° C.

EXAMPLE IV (p - Tolylphenyl)methylphenacylsulfonium tetrafluoroborate

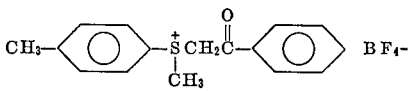

Employing the procedure of Example II above but replacing p-chlorophenyl phenacyl sulfide with a substantially equimolecular amount of p-tolylphenyl phenacyl sulfide there was obtained (p-tolylphenyl) methylphenacylsulfonium tetrafluoroborate, a tan solid melting at 130–135° C.

EXAMPLE V (p - tert - Butylphenyl)methylphenacylsulfonium tetrafluoroborate

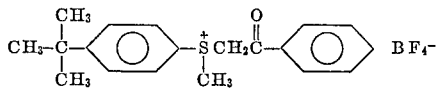

Employing the procedure of Example II above but replacing p-chlorophenyl phenacyl sulfide with a substantially equimolecular amount of p-tert-butylphenyl phenacyl sulfide there was obtained (p-tert-butylphenyl) methylphenacylsulfonium tetrafluoroborate, a colorless solid melting at 138–139° C.

EXAMPLE VI (p - tert - Butylphenyl)methyl(p-chlorophenacyl)sulfonium tetrafluoroborate

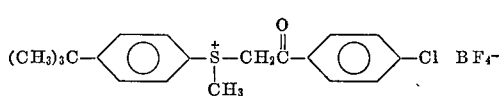

Employing the procedure of Example II above but replacing p-chlorophenyl phenacyl sulfide with a substantially equimolecular amount of p-tert-butylphenyl p-chlorophenacyl sulfide there was obtained (p-tert-butylphenyl)methyl(p-chlorophenacyl) sulfonium tetrafluoroborate, a colorless solid melting at 158–159° C.

EXAMPLE VII (p-Nitrophenyl)methylphenacylsulfonium tetrafluoroborate

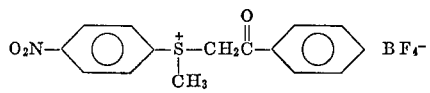

Employing the procedure of Example II above but replacing p-chlorophenyl phenacyl sulfide with a substantially equimolecular amount of p-nitrophenyl phenacyl sulfide there was obtained (p-nitrophenyl) metthylphenacylsulfonium tetrafluoroborate, a brown solid melting at 133–134° C.

EXAMPLE VIII (m - Tolyphenyl)methylphenacylsulfonium tetrafluoroborate

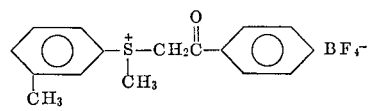

Employing the procedure of Example II above but replacing p-chlorophenyl phenacyl sulfide with a substantially equimolecular amount of m-tolylphenyl phenacyl sulfide there is obtained (m-tolylphenyl) methylphenacylsulfonium tetrafluoroborate, a colorless solid melting at 115–116° C.

EXAMPLE IX (p - tert-Butylphenyl)methyl(m-methoxyphenacyl)sulfonium tetrafluoroborate

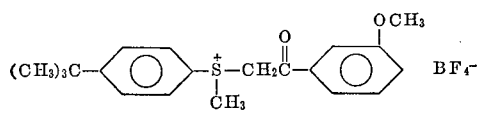

Employing the procedure of Example II above but replacing p-chlorophenyl phenacyl sulfide with a substantially equimolecular amount of p-tert-butylphenyl m-methoxyphenacyl sulfide there is obtained (p-tert-butylphenyl)methyl(m - methoxyphenacyl)sulfonium tetrafluoroborate, a colorless solid melting at 91–94° C.

EXAMPLE X (p - tert - Butylphenyl)methyl(p - methoxyphenacyl) sulfonium tetrafluoroborate

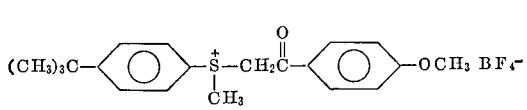

Employing the procedure of Example II above but replacing p-chlorophenyl phenacyl sulfide with a substantially equimolecular amount of p-tert-butylphenyl p-methoxyphenacyl sulfide there is obtained (p-tert-butylphenyl) methyl(p-methoxyphenacyl)sulfonium tetrafluoroborate, a colorless solid melting at 137–139° C.

EXAMPLE XI

Methyl (p-chlorophenacyl)phenylsulfonium tetrafluoroborate

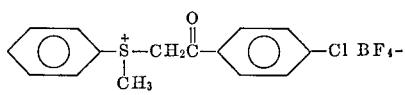

Employing the procedure of Example II above but replacing p-chlorophenyl phenacyl sulfide with a substantially equimolecular amount of phenyl p-chlorophenacyl sulfide there is obtained methyl (p-chlorophenacyl) phenylsulfonium tetrafluoroborate, a colorless solid melting at 155–157° C.

EXAMPLE XII (p - Chlorophenyl)methyl(p - methoxyphenacyl)sulfonium tetrafluoroborate

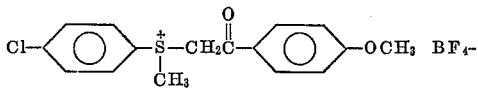

Employing the procedure of Example II above but replacing p-chlorophenyl phenacyl sulfide with a substantially equimolecular amount of p-chlorophenyl p-methoxyphenacyl sulfide there is obtained (p-chlorophenyl)methyl(p-methoxyphenacyl sulfonium tetrafluoroborate, a colorless solid melting at 143–144° C.

EXAMPLE XIII (p - Nitrophenyl)methyl(p - chlorophenacyl)sulfonium tetrafluoroborate

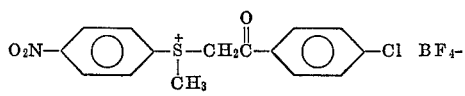

Employing the procedure of Example II above but replacing p-chlorophenyl phenacyl sulfide with a substantially equimolecular amount of p-nitrophenyl p-chlorophenacyl sulfide there is obtained (p-nitrophenyl)methyl-(p-chlorophenacyl)sulfonium tetrafluoroborate, a colorless solid melting at 170–174° C.

EXAMPLE XIV (p-Chlorophenyl)methyl(m - methoxyphenacyl)sulfonium tetrafluoroborate

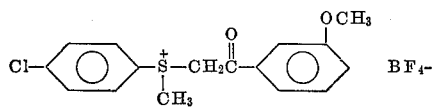

Empolying the procedure of Example II above but replacing p-chlorophenyl phenacyl sulfide with a substantially equimolecular amount of p-chlorophenyl m-methoxyphenacyl sulfide there is obtained (p-chlorophenyl)methyl(m-methoxyphenacyl)sulfonium tetrafluoroborate, a tan solid melting at 94–100° C.

In similar manner the following tetrafluoroborates are obtained:
(p-(p-ethylphenyl)methylphenacylsulfonium tetrafluoroborate
(o-tolylphenyl)methylphenacylsulfonium tetrafluoroborate
(m-propylphenyl)methylphenacylsulfonium tetrafluoroborate
(p-methoxyphenyl)methylphenacylsulfonium tetrafluoroborate
(p-fluorophenyl)methylphenacylsulfonium tetrafluoroborate
(p-iodophenyl)methylphenacylsulfonium tetrafluoroborate
(m-ethoxyphenyl)methylphenacylsulfonium tetrafluoroborate
(p-propoxyphenyl)methylphenacylsulfonium tetrafluoroborate
(m-butoxyphenyl)methylphenacylsulfonium tetrafluoroborate
(p-tert-butoxyphenyl)methylpenacylsulfonium tetrafluoroborate
(p-chlorophenyl)methyl(p-tolylphenacyl)sulfonium tetrafluoroborate
(p-chlorophenyl)methyl(m-bromophenacyl)sulfonium tetrafluoroborate
(p-chlorophenyl)methyl(p-fluorophenacyl)sulfonium tetrafluoroborate
(p-chlorophenyl)methyl(o-tolylphenacyl)sulfonium tetrafluoroborate
(p-chlorophenyl)methyl(p-iodophenacyl)sulfonium tetrafluoroborate
(p-chlorophenyl)methyl(p-ethylphenacyl)sulfonium tetrafluoroborate
(p-chlorophenyl)methyl(p-propylphenacyl)sulfonium tetrafluoroborate
(p-chlorophenyl)methyl(p-butylphenacyl)sulfonium tetrafluoroborate
(p-chlorophenyl)methyl(p-nitrophenacyl)sulfonium tetrafluoroborate
(m-tolylphenyl)methyl(m-ethoxyphenacyl)sulfonium tetrafluoroborate
(m-tolylphenyl)methyl(m-propoxyphenacyl)sulfonium tetrafluoroborate
(m-tolylphenyl)methyl(m-butoxyphenacyl)sulfonium tetrafluoroborate
(m-tolylphenyl)methyl(p-tert-butoxyphenacyl)sulfonium tetrafluoroborate Various important crop plants are attacked by the larval stage of soil insects of the genus Diabrotica, for example, the northern corn rootworm, *Diabrotica longicornis* and the western corn rootworm, *Diabrotica virgifera*, which feed specifically on the root system of corn plants, the southern corn rootworm (or spotted cucumber beetle), *Diabrotica undecimpunctata howardi* which attacks cucurbits, peanut pods, and also roots of corn plants, and the banded cucumber beetle, *Diabrotica balteata* which attacks root systems of sweet potatoes. The larval stage of these insects attack or eat all of the smaller roots of infested plants and form tunnels in the larger roots, thereby weakening or destroying them. Corn plants growing in fields infested with the northern or western corn rootworms exhibit poor growth and often die and the larger plants because of their weakened root system often fall down during or after a heavy rainfall or a strong wind. In addition, these soil insects seriously affect the quality of the harvested crop, particularly corn. This invention provides a means for combating soil insects of the aforementioned genus Diabrotica which involves bringing into contact with the larval stage thereof, as for example, by applying to the host soil such as cornfields, peanut fields, etc., an insecticidally effective amount of a compound of the class disclosed herein. To illustrate the activity of this class of compounds with respect to the southern corn rootworm, the following test was conducted.

To a growth pouch (diSPo* Seed-Pak growth pouch of Scientific Products Division of American Hospital Supply Corporation, Evanston, Ill.) in an upright position is added 20 ml. of distilled water. Thereafter is added 0.1 ml. of an acetone solution of known concentration in percent by weight of the compound to be evaluated as itemized below (for example an 0.1 ml. of an 0.1% by weight acetone solution of the compound provides a concentration of 5.0 p.p.m. thereof while 0.1 ml. of an 0.02% by weight acetone solution of the compound provides a concentration of 1.0 p.p.m. thereof). In the trough of the pouch formed by the paper wick thereof is placed two corn seeds (Zea maize, Hybrid U.S. 13) about one inch apart. Thereupon to the trough and between the seeds is added 8 to 12 ready-to-hatch species of Diabrotica corn rootworm eggs identified below, which eggs were washed (with distilled water) free of the soil in which they were incubated at room temperature for 21 days immediately prior to their placement in the trough. The so-charged growth pouch is then placed in an upright position in an incubator maintained at 80° F. and 70% relative humidity for 14 days. Thereupon the growth pouches are removed and the extent of kill in percent of the particular species of corn rootworm eggs observed. The observations were as follows:

| Compound Example No. | Concentration in p.p.m. | Percent kill of SRC[1] |
|---|---|---|
| II | 5 | 100 |
| III | 5 | 80 |
| IV | 5 | 50 |
| VII | 5 | 40 |
| VIII | 5 | 30 |
| X | 5 | 100 |
| XI | 5 | 60 |
| XIV | 5 | 100 |

[1] SRC means larvae of the southern corn rootworm species, *Diabrotica undecimpunctata howardi*.

To demonstrate biocidal effectiveness on another species of the genus Diabrotica; namely, larvae of the western corn rootworm, *Diabrotica virgifera*, representative evaluations were made in accordance with the following procedure:

A 1 ml. portion of an acetone/distilled water solution containing a known quantity in p.p.m. of the test compound is pipetted into a petri dish (100 x 15 mm.) having a sheet of filter paper (9 cm. diameter) placed in the center thereof. Two sections of corn roots (each 1 inch in length) are then placed in the dish, followed by infestation of the dish contents with newly hatched western corn rootworm larvae from diapaused eggs (5 larvae are placed in each dish). The petri dish is placed in a container to preserve moisture and thereafter inserted in a constant temperature-humidity box maintained at 25° C. and 70 percent relative humidity. After 24 hours mortalities are observed using a microscope for accurate reading and the results recorded. The observations made are as follows:

| Compound Example No. | Concentration in p.p.m. | Percent kill of WRC[1] |
|---|---|---|
| II | 4 | 100 |
| X | 4 | 60 |
| XI | 4 | 100 |
| XIV | 4 | 40 |

[1] WRC means larvae of the western corn rootworm species, *Diabrotica virgifera*.

Although the compounds of this invention are useful per se in destroying Diabrotica larvae, it is preferable that they be supplied to the larvae or to the environment of the larvae in a dispersed form in a suitable extending agent. The exact concentration employed in destroying said larvae can vary considerably provided the required dosage (i.e. toxic or insecticidal amount) of the compound is supplied to the larvae or to the environment of the larvae. When the extending agent is a liquid or mixture of liquids (e.g. as in solutions, suspensions, emulsions, or aerosols) the concentration of the insecticidal compound employed to supply the desired dosage generally will be in the range of 0.001 to 50 percent by weight. When the extending agent is a semi-solid or solid, the concentration of the insecticidal compound employed to supply the desired dosage generally will be in the range of 0.1 to 25 percent by weight. From a practical point of view, the manufacturer must supply the user with a low cost concentrate or spray base or particulate solid base in such form that, by merely mixing with water or finely divided inert solid extender (e.g. powdered clay or talc) or other low cost material available to the user at the point of use, he will have an easily prepared insecticidal spray or particulate solid. In such a concentrate composition, the insecticidal compound generally will be present in a concentration of 5 to 95 percent by weight, the residue being any one or more of the well known insecticidal adjuvants, such as the surface-active clays, solvents, diluents, carrier media, adhesives, spreading agents, humectants, and the like, but particularly a finely divided solid extender.

There are a large number of organic liquids which can be used for the preparation of solutions, suspensions or emulsions of the insecticidal compounds of the invention. For example, isopropyl ether, acetone, methyl ethyl ketone, octanone, dioxane, cyclohexanone, carbon tetrachloride, ethylene dichloride, tetrachloroethane, hexane, heptane and like higher liquid alkanes, hydrogenated naphthalenes, solvent naphtha, benzene, toluene, xylene, petroleum fractions (e.g. those boiling almost entirely under 400° F., and having a flash point above about 80° F., particularly kerosene), mineral oils having an unsulfonatable residue above about 80 percent and preferably above about 90 percent. In those instances wherein there may be concern about the phytotoxicity of the organic liquid extending agent a portion of same can be replaced by such low molecular weight aliphatic hydrocarbons as dipentene, diisobutylene, propylene trimer, and the like or suitable polar organic liquids such as the aliphatic ethers and the aliphatic ketones containing not more than about 10 carbon atoms as exemplified by acetone, methyl ethyl ketone, diisobutyl ketone, dioxane, isopropyl ether, and the like. In certain instances, it is advantageous to employ a mixture of organic liquids as the extending agent, e.g. an aromatic hydrocarbon and an aliphatic ketone.

When the insecticidal compounds of this invention are to be supplied to the larvae or to the environment of the larvae as aerosols, it is convenient to dissolve them in a suitable solvent and disperse the resulting solution in dichlorodifluoromethene or like chlorofluoroalkane which boils below room temperature at atmospheric pressure.

The insecticidal compounds of this invention are preferably supplied to the larvae or to the environment of the larvae in the form of emulsions or suspensions. Emulsions or suspensions are prepared by dispersing the insecticidal compound of this invention either per se or in the form of an organic solution thereof in water with the aid of a water-soluble nonionic or anionic surfactant or mixtures thereof. The term "surfactant" as employed here and in the appended claims is used as in vol. II of Schwartz, Perry and Berch's "Surface Active Agents and Detergents" (1958, Interscience Publishers, Inc., New York) in place of the expression "emulsifying agent," to connote generically the various "emulsifying agents," "dispersing agents," "wetting agents" and "spreading agents" that are adapted to be admixed with the active compounds of this invention in order to secure better wetting and spreading of the active ingredients in the water vehicle or carrier in which they are insoluble through lowering the surface tension of the water (see also Frear "Chemistry of Insecticides, Fungicides and Herbicides," second edition, page 280). The surfactants contemplated are the well-known capillary active substances which are non-ionic or anionic and which are described in detail in volumes I and II of Schwartz, Perry and Berch's "Surface Active Agents and Detergents," (1958, Interscience Publishers, Inc., New York) and also in the November 1947 issue of Chemical Industries (pages 811–824) in an article entitled, "Synthetic Detergents," by John W. McCutcheon and also in the July, August, September and October, 1952 issues of Soap and Sanitary Chemicals under the title "Synthetic Detergents." The disclosures of these articles with respect to non-ionizing capillary active substances are incorporated in this specification by reference in order to avoid unnecessary enlargement of this specification. The preferred surfactants are the water soluble anionic and non-ionic surface active agents set forth in U.S. 2,846,398 (issued Aug. 5, 1958).

The insecticidal compound of this invention can be dispersed by suitable methods (e.g. tumbling or grinding) in solid extending agents either of organic or inorganic nature and supplied to the larvae environment in particulate form. Such solid materials include for example, tricalcium phosphate, calcium carbonate, kaolin, bole, kieselguhr, talc, bentonite, fuller's earth, pyrophillite, diatomaceous earth, calcined magnesia, volcanic ash, sulfur and the like inorganic solid materials, and include for example, such materials of organic nature as powdered cork, powdered wood, and powdered walnut shells. The preferred solid carriers are the adsorbent clays, e.g. bentonite. These mixtures can be used for insecticidal purposes in the dry form, or by addition of water-soluble anionic or non-ionic surfactants the dry particulate solids can be rendered wettable by water so as to obtain stable aqueous dispersions or suspensions suitable for use as sprays.

For special purposes the insecticidal compounds of this invention can be dispersed in a semi-solid extending agent such as petrolatum with or without the aid of solubility promoters and/or surfactants.

In all of the forms described above the dispersions can be provided ready for use in combatting the larvae or they can be provided in a concentrated form suitable for mixing with or dispersing in other extending agents. As illustrative of a particularly useful concentrate is an intimate mixture of an insecticidal compound of this invention with a water-soluble anionic or non-ionic surfactant or mixtures thereof which lowers the surface tension of water in the weight proportions of 0.1 to 15 parts of surfactant with sufficient of the insecticidal compound of this invention to make 100 parts by weight. Such a concentrate is particularly adapted to be made into a spray for combatting various forms of the aforedescribed larvae by the addition of water thereto. As illustrative of such a concentrate is an intimate mixture of 20 parts by weight of (p-chlorophenyl) methylphenacylsulfonium tetrafluoroborate and from 2 to about 4 parts by weight of a water-soluble non-ionic surfactant such as the polyoxyethylene derivatives of $C_{8-12}$ alkyl substituted phenols such as nonylphenol or dodecylphenol.

Another useful concentrate adapted to be made into a spray for combatting the aforedescribed larvae is a solution (preferably as concentrated as possible) of the insecticidal compound of this invention in an organic solvent therefor. The said liquid concentrate preferably contains dissolved therein a minor amount (e.g. 0.5 to 10 percent by weight of the weight of the new insecticidal agent) of a non-ionic or anionic surfactant, which surfactant is also water-soluble. As illustrative of such a concentrate is a solution of (p-chlorophenyl) methylphenacylsulfonium tetrafluoroborate in a mixture of xylene and 2-octanone which solution contains dissolved therein a water-soluble non-ionic surfactant such as the polyoxyethylene derivatives of $C_{8-12}$ alkyl substituted phenols such as nonylphenol and dodecylphenol.

The insecticidal compounds of this invention can also be advantageously employed in combination with other pesticides, including, for example, nematocides, bactericides, fungicides, and herbicides. In this manner it is possible to obtain mixtures which are effective against a wide variety of pests and other forms of noxious life.

In the destruction of the aforedescribed larvae the insecticidal compound of this invention either per se or compositions comprising same are supplied to the larvae or to their environment in a toxic or insecticidal amount. This can be done by dispersing the new insecticidal agent or composition comprising same in, on or over an infested environment or in, on or over an environment the larvae frequent, e.g. agricultural soil or other growth media or other media attractable to the larvae for habitational or sustenance purposes, in any conventional fashion which permits the larvae to be subject to the insecticidal action of the insecticidal compounds of this invention. Such dispersing can be brought about by applying sprays or particulate solid compositions to a surface infested with the larvae or attractable to the larvae, as for example, the surface of an agricultural soil or other habitat media such as the above ground surface of host plants by any of the conventional methods, e.g. power dusters, boom and hand sprayers, and spray dusters. Also for subsurface application such dispersing can be carried out by simply mixing the new insecticidal agent per se or insecticidal spray or particulate solid compositions comprising same with the infested environment or with the environment the larvae frequent, or by employing a liquid carrier for the new insecticidal agents to accomplish sub-surface penetration and impregnation therein.

While this invention has been described with respect to certain embodiments, it is to be understood that it is not so limited and that variations and modifications thereof obvious to those skilled in the art can be made without departing from the spirit and scope thereof.

What is claimed is:

1. A method of combating insects of the genus Diabrotica which comprises bringing into contact with the larval stage of said insects an insecticidally effective amount of a compound of the formula

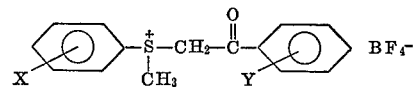

wherein X and Y are like or unlike radicals selected from the group consisting of hydrogen, nitro, lower alkyl, lower alkoxy and halogen.

2. The method in accordance with claim 1 in which X is para oriented and selected from the group consisting of hydrogen, methyl, tert-butyl, nitro and a halogen of atomic weight between 35 and 80; and Y is selected from the group consisting of hydrogen, methoxy and chlorine; and wherein not more than one of X and Y is hydrogen.

3. The method in accordance with claim 1 wherein the compound is (p-chlorophenyl)methylphenacylsulfonium tetrafluoroborate.

4. The method in accordance with claim 1 wherein the compound is (p-tert-butylphenyl)methyl(p-methoxyphenacyl)sulfonium tetrafluoroborate.

5. The method in accordance with claim 1 wherein the compound is (p-chlorophenyl)methyl(m-methoxyphenacyl)sulfonium tetrafluoroborate.

6. The method in accordance with claim 1 wherein the compound is (p-chlorophenacyl)phenylsulfonium tetrafluoroborate.

7. The method in accordance with claim 1 wherein the compound is (p-bromophenyl)methylphenacylsulfonium tetrafluoroborate.

8. An insecticidal composition comprising an inert insecticidal adjuvant, and as an active ingredient, an insecticidally effective amount of a compound of the formula

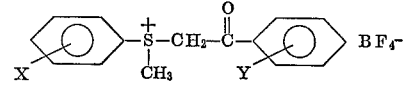

wherein X and Y are like or unlike radicals selected from the group consisting of hydrogen, nitro, lower alkyl, lower alkoxy and halogen.

9. A composition in accordance with claim 8 wherein X is para oriented and selected from the group consisting of hydrogen, methyl, tert-butyl, nitro and a halogen of atomic weight between 35 and 80; and Y is selected from the group consisting of hydrogen, methoxy and chlorine; and wherein not more than one of X and Y is hydrogen.

10. A composition in accordance with claim 8 wherein the compound is (p-chlorophenyl)methylphenacylsulfonium tetrafluoroborate.

11. A composition in accordance with claim 8 wherein the compound is (p-tert-butylphenyl)methyl(p-methoxyphenacyl)sulfonium tetrafluoroborate.

12. A composition in accordance with claim 8 wherein the compound is (p-chlorophenyl)methyl(m-methoxyphenacyl)sulfonium tetrafluoroborate.

13. A composition in accordance with claim 8 wherein the compound is (p-chlorophenacyl)phenylsulfonium tetrafluoroborate.

14. A composition in accordance with claim 8 wherein the compound is (p-bromophenyl)methylpenacylsulfonium tetrafluoroborate.

References Cited

UNITED STATES PATENTS

| 3,519,713 | 7/1970 | Ludvik | 424—185 |
| 3,651,222 | 3/1972 | Gee | 424—185 |

JEROME D. GOLDBERG, Primary Examiner

D. R. ORE, Assistant Examiner

U.S. Cl. X.R.

424—45, 357